Patented Sept. 24, 1946

2,408,353

UNITED STATES PATENT OFFICE 2,408,353

PIGMENTED RESIN GEL

Harry A. Toulmin, Jr., Oakwood, Ohio, assignor, by mesne assignments, to Chemical Developments Corporation, Dayton, Ohio, a corporation of Ohio No Drawing. Original application November 8, 1939, Serial No. 303,447. Divided and this application March 17, 1943, Serial No. 479,483

4 Claims. (Cl. 260—19)

This invention deals with pigmented resin gel, and is a division of copending application Serial No. 303,447, filed November 8, 1939.

It is an object of this invention to provide a uniform colored resin which is adapted to be readily dispersed in a suitable solvent to form a liquid resinous product which may be utilized in the compounding of plastics or be mixed with the conventional paint and lacquer vehicles to provide a suitable coating composition.

Another object is to devise a colored resin where the color is produced by the incorporation of a dye or pigment which is dispersed therein and is mechanically and chemically bound to the resinous product.

Another object is to devise a process and product comprising a resinous composition in which pigment or coloring substances are dispersed throughout the resin without requiring grinding of the pigment or coloring therein so as to form a homogeneous uniformly colored product.

Another object is to provide a pigmented natural or synthetic resin which is adapted for use in compounding plastics, rubber, paints, lacquers, cements, linoleum and similar products.

Another object is to devise a pigmented resinous gel composition wherein the pigment is maintained in a suspended dispersed state providing a product which can be readily incorporated with drying oils, oleoresinous or cellulose lacquer vehicles to provide a liquid coating composition.

Another object is to provide a pigmented resin which can be shipped without the addition of solvents whereby the user can incorporate the proper solvent or other constituents as required to produce the desired composition.

Another object is to devise a process for making homogeneous pigmented dispersions of gelled resins wherein the pigment or coloring matter comprises a surface-active wetting agent to bring about the uniform dispersion of the pigment or coloring substance in the resinous product.

Another object is to provide a homogeneous pigmented dispersion of gelled resin which product is adapted to be subsequently degelled by the introduction of solvents so as to produce a smooth flowing liquid composition.

In general, this invention involves the production of a resinous pigmented gel wherein the coloring matter is dispersed throughout the resinous composition without requiring protracted grinding of the pigment with a vehicle to effect dispersion thereof as has been the practice heretofore. This is broadly accomplished by first treating the pigment or coloring particles with a surface-active agent which functions as a deflocculating or pigment dispersing agent. This treated pigment is thereafter intimately mixed into the resin or reacted mixture in the case of synthetic resin and the mixture heated to produce a homogeneous resin gel having the coloring matter uniformly dispersed throughout the product.

In order to illustrate this invention further, the following typical examples of the procedure to be followed in producing the products and processes of this invention are given:

Example I

The filler or pigment, such as whiting, zinc oxide, lithopone, iron oxide, carbon black, lamp black or the like coloring matter commonly used in compounding plastics and coating compositions, is mixed with a surface-active dispersing agent. For this purpose 1 to 3 per cent by weight of a wetting agent, based on the total weight of the pigment, is employed. The surface-active or wetting agent utilized may comprise one or more of the following substances: fatty acid soaps, stearic, abietic, benzoic, and phthalic acids, lecithin and diglycol laurate.

The pigment and deflocculating agent are mixed together until the particles of pigment are coated with the deflocculant. If necessary, a small amount of solvent or thinner for the resin may be used to bring about the thorough dispersion of the deflocculant with the pigment.

This anti-compactant treated pigment is then added in sufficient amount to the synthetic or natural resin which is to be pigmented. Thereafter the mixture of resin and treated pigment is heated and stirred until a viscous product results in which the pigment is thoroughly dispersed. Where high temperature heat treatment is detrimental to the coloring matter, it will be understood that the temperature will be maintained below that which will effect the coloring substance used. Further, where the resinous mass is of sufficient consistency at room temperature, the pigment or coloring matter is dispersed therein by thoroughly masticating or mixing the materials together without the application of heat. Gelling agents such as stearate or palmitate metallic soaps may be incorporated into the resinous pigment mass with or without the addition of a surface-active substance to promote the gel formation.

It will be appreciated that other surface-active dispersing agents may be used than those mentioned. It is preferred in each case to utilize as the pigment dispersing or wetting agent one which will also function as an interbonding promoter. In this way the coloring matter or pigment is chemically as well as mechanically bound to the resinous particles.

*Example II*

In this instance, rosin, kauri, or similar natural resin is fused, and the pigment which is to be incorporated in the resin is added together with the solvent. The pigment will be previously treated with a suitable dispersing agent as in Example I and preferably the coloring matter is previously mixed with the solvent thinner. The thinner utilized may be naphtha, xylol, toluol, or other equivalent solvent in which the resin is compatible. The mixture of resin, pigment and thinner is then heated under a reflux condenser at approximately the fusing temperature of the resin until a resinous gel is produced. The solvent employed may be of higher boiling type than toluol or xylol so long as it is chemically non-reactive with the resin.

*Example III*

In this example a pigmented synthetic resin gel of the alkyd type is produced. In producing this product phthalic anhydride, glycerol or equivalent polyhydric alcohol is reacted in the usual manner to produce the resin. The pigment, which is to be dispersed in the synthetic resin, is treated with the dispersing agent, as mentioned above, and mixed with the liquid ingredients prior to reacting the materials together to form the resin. In this way glycerol and pigment will be mixed and then reacted with the phthalic anhydride to produce a pigmented alkyd resin wherein the coloring particles are mechanically and chemically bonded with the resin. When it is desired to accentuate the color by the use of dyes, the appropriate dye is previously dissolved in the solvent and mixed with the pigment and liquid constituents which are reacted together to form the resin. Where required, additions of solvent may be made to the pigment in order to properly incorporate the pigment in the resinous constituents.

*Example IV*

In the making of an oil modified alkyd resin having pigment dispersed therein the appropriate amount of phthalic anhydride, glycerol and vegetable drying oil fatty acids is mixed together and the deflocculant treated pigment stirred therein and the whole mixture reacted together to form the oil modified alkyd resin. As a typical example for making this product, 100 parts by weight of glycerol, 150 parts by weight of vegetable drying oil fatty acids, 225 parts by weight of phthalic anhydride and 160 parts by weight of a high boiling solvent are mixed together and heated to approximately 500 degrees F. and the desired amount of pigment which has been previously treated with a dispersing agent is stirred into the liquid batch mixture. The heating is then continued at about 500 to 525 degrees F. using a reflux condenser until the resinous pigment mixture becomes homogeneous.

Thereafter the heating is continued with frequent additions of solvent until gelation of the resin pigment mass is brought about. The gelled resinous product comprising the pigment may be thereafter filtered to remove foreign particles if necessary. The heating is regulated so that a soft resin pigment gel is produced which can be readily cut by the paint and lacquer solvents. The high boiling solvent utilized in this example should have a boiling point of around 225 to 325 degrees F. Examples of the solvents which may be employed are petroleum naphtha, Hi-flash naphtha, tetrachlorethane, dichloroethyl ether, dichlorobenzene and the like.

*Example V*

In the preparation of a pigmented China-wood oil acid modified alkyd resin, the following procedure may be employed. A mixture of 100 parts by weight of glycerol, 150 parts by weight of China-wood oil fatty acids, 225 parts by weight of phthalic anhydride and 160 parts by weight of high boiling solvent thinner, such as mentioned above in Example IV, is combined at a temperature of about 550 degrees F. Thereafter the required amount of deflocculant treated pigment is gradually stirred into the liquid mixture and the heating continued at about 450 degrees F. under a reflux condenser, until a soft resinous pigmented gel is formed which can be redissolved in paint solvents.

*Example VI*

In the making of a phenol aldehyde type pigmented resin gel the following process is typical. To 100 parts by weight of cresol there is added 70 parts by weight of formaldehyde (30 per cent formaldehyde) and the mixture heated until the cresol and formaldehyde have acted. Thereafter the water and uncombined cresol are distilled off and there is added approximately 800 parts by weight of rosin in melted condition. The whole mixture is then heated in an autoclave or closed vessel until a resin of clear homogeneous character is produced which is free from the odor of phenol. The volatile substances are then removed while stirring and 100 parts by weight of glycerol together with the deflocculant treated pigment is stirred into the mixture. The mixture is then heated to approximately 500 degrees F. and held at this temperature until the glycerol is reacted to form the ester and a resinous gel product is produced.

Other suitable polyhydric alcohols may be used, such as diethylene glycol, ethylene glycol, propylene glycol, or triethanolamine. Various modifying agents, such as drying oil fatty acids, may be incorporated as constituents in making the above resin to produce a resin having the desired properties.

It will be understood that the pigmented resin gel compositions may be combined with cellulose derivatives such as nitrocellulose, cellulose acetate and the like to produce homogeneous pigmented compositions which may be used in the formulation of cellulose derivative lacquers and cellulose plastics. Additions of plasticizers such as tricresyl phosphate, dibutyl phthalate and the like may be made to provide a product of the desired flexibility.

It will be appreciated that this invention is adapted for compounding pigment or coloring matter with the various types of natural and synthetic resins such as ester gum, dammar, mastic, Glyptals, phenol aldehyde resins, vinyl resins, methyl, ethyl, and benzyl abietates, chlorinated diphenyls, toluene-sulfonamide-aldehyde resins, and alkyl resins which act as film-forming materials.

In order to enhance the dispersion of the pigment in the resinous gel formation, particularly in connection with the use of carbon black, lamp black and the like pigments which have a greater tendency to flocculate than white pigments, the treatment of the coloring material with dispersing agent as well as in the final mixing of the same with the resinous mixture may, if desired, be performed in a vacuum. This procedure increases the wetting effect of the pigment and improves its dispersibility in the resinous composition. The mixing of the pigment and synthetic resin formulation also shortens the time of incorporating the pigment in the resinous mixture and improves the dispersion of the same therein.

In the use of the dispersing agent or surface-active material it is only necessary to incorporate an amount so that an adsorbed layer of the dispersing agent of about one molecule thickness is coated onto the pigment particles. The pigmented resinous products can be utilized in the making of molded plastic materials. In this instance the freshly gelled pigmented resinous product is mixed with the filler such as wood flour, chalk, or the like while it is hot and the material molded under heat and pressure to the desired shape. Thermosetting as well as thermoplastic types of resin may be employed as desired.

It will be understood that this invention provides a uniform homogeneous colored resinous gel which may be used in various arts where pigmented or colored resin constituent is required to be incorporated.

It will be understood that while there have been described herein certain embodiments of the present invention, it is not intended thereby to limit this invention to the particular details of procedure, materials or products herein described in view of the fact that this invention may be modified according to individual conditions and preference without necessarily departing from the spirit of this disclosure and the scope of the appended claims.

I claim:

1. The method comprising heating together 100 parts by weight of cresol and 70 parts by weight of 30% formaldehyde for time sufficient to cause reaction of all the formaldehyde present, distilling off water and uncombined cresol, adding approximately 800 parts by weight of fused rosin, heating the mixture in a closed vessel until a clear homogeneous resin free from cresol odor has been formed, driving off volatile substances while adding to the mixture 100 parts by weight of glycerol together with a waterfree pigment previously treated with a dispersing agent therefor, and continuing heating the mixture at a temperature of approximately 500° F. until the glycerol has fully reacted to form ester products, whereby there is obtained a pigmented resinous gel in which the pigment is uniformly and finely dispersed, said pigmented gel being adapted for use in compounding enamels, lacquers, plastics, and the like.

2. The method comprising heating together 100 parts by weight of cresol and 70 parts by weight of 30% formaldehyde for time sufficient to cause reaction of all the formaldehyde present, distilling off water and uncombined cresol, adding approximately 800 parts by weight of fused rosin, heating the mixture in a closed vessel until a clear homogeneous resin free from cresol odor has been formed, driving off volatile substances while adding to the mixture 100 parts by weight of glycerol together with a waterfree pigment previously treated with stearic acid, and continuing heating the mixture at a temperature of approximately 500° F. until the glycerol has fully reacted to form ester products, whereby there is obtained a pigmented resinous gel in which the pigment is uniformly and finely dispersed, said pigmented gel being adapted for use in compounding enamels, lacquers, plastics, and the like.

3. The method comprising heating together 100 parts by weight of cresol and 70 parts by weight of 30% formaldehyde for time sufficient to cause reaction of all the formaldehyde present, distilling off water and uncombined cresol, adding approximately 800 parts by weight of fused rosin, heating the mixture in a closed vessel until a clear homogeneous resin free from cresol odor has been formed, driving off volatile substances while adding to the mixture 100 parts by weight of glycerol together with a waterfree pigment previously treated with abietic acid, and continuing heating the mixture at a temperature of approximately 500° F. until the glycerol has fully reacted to form ester products, whereby there is obtained a pigmented resinous gel in which the pigment is uniformly and finely dispersed, said pigmented gel being adapted for use in compounding enamels, lacquers, plastics, and the like.

4. The method comprising heating together 100 parts by weight of cresol and 70 parts by weight of 30% formaldehyde for time sufficient to cause reaction of all the formaldehyde present, distilling off water and uncombined cresol, adding approximately 800 parts by weight of fused rosin, heating the mixture in a closed vessel until a clear homogeneous resin free from cresol odor has been formed, driving off volatile substances while adding to the mixture 100 parts by weight of glycerol together with a waterfree pigment previously treated with fatty acid soap, and continuing heating the mixture at a temperature of approximately 500° F. until the glycerol has fully reacted to form ester products, whereby there is obtained a pigmented resinous gel in which the pigment is uniformly and finely dispersed, said pigmented gel being adapted for use in compounding enamels, lacquers, plastics, and the like.

HARRY A. TOULMIN, Jr.